US007862631B2

(12) United States Patent
Burch et al.

(10) Patent No.: US 7,862,631 B2
(45) Date of Patent: Jan. 4, 2011

(54) FUEL PROCESSOR PRIMARY REACTOR AND COMBUSTOR STARTUP VIA ELECTRICALLY-HEATED CATALYST

(75) Inventors: Steven D. Burch, Honeoye Falls, NY (US); William H. Pettit, Rochester, NY (US); Steven G. Goebel, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1856 days.

(21) Appl. No.: 10/360,996

(22) Filed: Feb. 7, 2003

(65) Prior Publication Data

US 2004/0154222 A1    Aug. 12, 2004

(51) Int. Cl.
*B01J 7/00* (2006.01)
*H01M 8/06* (2006.01)
*C01B 3/36* (2006.01)
*C10J 3/46* (2006.01)
*C10J 3/54* (2006.01)

(52) U.S. Cl. ........................................ 48/61; 48/197 R
(58) Field of Classification Search ................ 48/127.9, 48/61, 197 R; 422/177, 180, 211
See application file for complete search history.

(56) References Cited

U.S. PATENT DOCUMENTS 4,982,564 A * 1/1991 Hines ........................ 60/39.55
6,077,620 A 6/2000 Pettit ............................ 429/26
6,232,005 B1 * 5/2001 Pettit ............................ 429/19
6,514,468 B2 * 2/2003 DeCourcy et al. ............ 422/177
6,641,795 B2 * 11/2003 Abe ........................ 423/648.1
6,869,456 B2 * 3/2005 Salemi et al. ............. 48/197 R
2002/0108309 A1 * 8/2002 Grieve et al. ............. 48/197 R
2004/0131540 A1 * 7/2004 Fujii et al. .................. 423/650

FOREIGN PATENT DOCUMENTS

JP    2001354402 A  * 12/2001

* cited by examiner

*Primary Examiner*—Alexa D Neckel
*Assistant Examiner*—Matthew J Merkling
(74) *Attorney, Agent, or Firm*—John A. Miller; Miller IP Group, PLC

(57) ABSTRACT

A primary reactor for a fuel processor system that employs steam and air to convert a liquid hydrocarbon fuel into a hydrogen-rich gas stream. The liquid fuel and an air-steam mixture are mixed in a mixing region within the reactor. The fuel mixture is then directed through an electrically heated catalyst region that heats the mixture to the operation temperature of a light-off catalyst at system start-up. The heated fuel mixture is then directed through a light-off catalyst monolith where the hydrocarbon fuel is dissociated. Once the fuel mixture is heated to the operating temperature of the light-off catalyst, the electrically heated catalyst region is turned off because the exothermic reaction in the light-off catalyst monolith generates the heat necessary to sustain the catalytic reaction.

28 Claims, 3 Drawing Sheets

FUEL PROCESSOR PRIMARY REACTOR AND COMBUSTOR STARTUP VIA ELECTRICALLY-HEATED CATALYST

BACKGROUND OF THE INVENTION

1. Field of the Invention

This invention relates generally to a primary reactor for a fuel processor system and, more particularly, to a primary reactor for a fuel processor system, where the reactor includes an electrically heated catalyst for improved system start-up.

2. Discussion of the Related Art

Hydrogen is a very attractive source of fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives a hydrogen gas and the cathode receives an oxygen gas. The hydrogen gas is ionized in the anode to generate free hydrogen protons and electrons. The hydrogen protons pass through the electrolyte to the cathode, where they react with the oxygen and the electrons in the cathode to generate water as a by-product. The electrons from the anode cannot pass through the electrolyte, and thus are directed through a load to perform work before being sent to the cathode. The work acts to operate the vehicle. Many fuels cells are typically combined in a fuel cell stack to generate the desired power.

Proton exchange membrane fuel cells (PEMFCs) are a popular fuel cell for vehicles. In a PEMFC, hydrogen ($H_2$) is the anode reactant, i.e., fuel, and oxygen is the cathode reactant, i.e., oxidant. The cathode reactant can be either pure oxygen or air (a mixture of $O_2$ and $N_2$). The PEMFC generally includes a solid polymer electrolyte proton conducting membrane, such as a perflurosulfonic acid membrane. The anode and cathode typically include finely divided catalytic particles, usually platinum (Pt), supported on carbon particles and mixed with an isomer. The combination of the anode, cathode and membrane define a membrane electrode assembly (MEA). MEAs are relatively expensive to manufacturer and require certain conditions for effective operation. These conditions include proper water management and humidification, and control of catalyst poisoning constituents, such as carbon monoxide (CO).

In vehicle fuel cell applications, it is desirable to use a liquid fuel, such as alcohols (methanol or ethanol), hydrocarbons (gasoline), and/or mixtures thereof, such as blends of ethanol/methanol and gasoline, as a source of hydrogen for the fuel cell. Usually, hydrocarbon-based liquid fuels are dissociated within a chemical fuel processor system or reformer to release the hydrogen therefrom for fueling the cell. The fuel processor system contains one or more reactors where the fuel is reacted chemically to break down the hydrocarbons in the fuel with water and/or air to generate a reformate gas comprising hydrogen and carbon monoxide, methane, nitrogen, carbon dioxide and water as by-products.

Generally, the reactor is a steam reformer or auto-thermal reactor (ATR). The steam reformer requires an external heat source to generate the heat required to dissociate the hydrocarbon fuel. The ATR includes a partial oxidation (POX) reactor and a steam reformer. The POX reactor includes a catalyst that generates heat by an exothermic reaction to heat the steam reformer and dissociate the hydrocarbon fuel. A steam reformer typically provides a higher conversion percentage of the hydrocarbon fuel into hydrogen than the POX reactor. However, a steam reformer requires a significant heat input than the POX reactor.

The known fuel processor systems also typically include downstream reactors, such as water-gas shift (WGS) reactors and preferential oxidation (PROX) reactors. The WGS and PROX reactors are necessary to convert carbon monoxide (CO) to carbon dioxide ($CO_2$) in the reformate gas because carbon monoxide contaminates the catalytic particles in the PEM fuel cell stack. It is desirable that the carbon monoxide in the reformate gas be less than 100 ppm to be suitable for fuel cell applications. The WGS reactor employs catalysts that convert carbon monoxide and water to carbon dioxide and hydrogen. The PROX reactor employs catalysts that selectively oxidize carbon monoxide (using oxygen from air as an oxidant) in the presence of hydrogen to produce carbon dioxide ($CO_2$).

The reformate gas stream passes through the fuel cell stack that utilizes the hydrogen in the reformate gas and oxygen from air. An anode exhaust gas and a cathode exhaust gas are discharged from the stack. The anode exhaust gas is the anode input gas stream minus the hydrogen used by the stack and the cathode exhaust gas is a depleted oxygen stream. The two exhaust gas streams, in some designs, are then sent to a tail gas combustor, which consumes the anode exhaust gas using oxygen from air or the cathode exhaust gas. The combustor energy can be employed to integrate heat into the fuel processor system, run an expander, run a co-generation process or be exhausted.

FIG. 1 is a plan view of a fuel processor system 10 for generating hydrogen to be used in a fuel cell engine of the type discussed above. A hydrocarbon fuel, such as gasoline, natural gas, methane, propane, methanol and/or mixtures thereof, is fed to a primary reactor 14, such as an ATR, from a suitable source (not shown) on a line 16. The hydrocarbon fuel reacts with a steam/air mixture received on a line 18 from a heat exchanger 20 to dissociate the hydrogen from the fuel and generate a hydrogen-rich reformate gas. The reactor 14 includes a steam reforming and/or partial oxidation catalyst suitable for the specific fuel being used. The operating temperature of the reactor 14 depends on the nature of the fuel and the relative compositions of fuel, air and water, and is typically between 300° C. and 800° C. The reformate gas exiting the primary reactor 14 on a line 44 contains primarily hydrogen, nitrogen, carbon monoxide, carbon dioxide, water and possibly methane.

The steam for the steam/air mixture is generated in a heat exchanger 24, where liquid water provided on a line 26 is heated and vaporized in the heat exchanger 24 by a hot exhaust stream on a line 28 from a combustor 30, such as a tail gas combustor. The steam exits the heat exchanger 24 on a line 34 and is mixed with compressed air provided on a line 36 in a mixing zone or valve 38. The steam/air mixture exits the zone or valve 38 on a line 40 to be sent to the heat exchanger 20 to form the hot steam/air mixture on the line 18 sent to the reactor 14. The heat required to raise the temperature of the steam on the line 40 in the heat exchanger 20 is generated by the reformate gas from the reactor 14 on the line 44. Alternatively, the air and water can be heated separately and mixed either within or before the primary reactor 14.

It is necessary to convert carbon monoxide to carbon dioxide in the reformate gas being used in a fuel cell stack because carbon monoxide contaminates the catalyst particles used therein. The carbon monoxide concentration of the reformate gas on the line 44 is typically between about 5 mole percent and about 20 mole percent. Typically, fuel processing systems employ WGS reactors to reduce the carbon monoxide in the reformate gas flow. The reformate gas on the line 44 is cooled in the heat exchanger 20 to the operational temperature of a WGS reactor 48. The cooled reformate gas is then applied to the WGS reactor 48 on a line 50, where carbon monoxide and water are converted to hydrogen and carbon dioxide by a catalyst reaction process that is well understood in the art. Conventional catalysts, such as $Fe_3O_4/Cr_2O_3$ for high temperature shifts or $CuO/ZnO/Al_2O_3$ for low temperature shifts, may be used, as well as any other known WGS catalyst.

The WGS reactor 48 can be a high temperature WGS reactor (320° C.-500° C.), a medium temperature WGS reactor (250° C.-400° C.), or a low temperature WGS reactor (150° C.-250° C.). Alternately, the reactor 48 can include a combination of high, medium and low temperature WGS reactors that employ a technique for cooling the reformate gas as it flows between the different temperature reaction zones. Generally, the temperature of the WGS reactor 48 decreases with the direction of the reformate gas flow.

The WGS reactor 48 generates a reformate gas flow on a line 52 that is primarily hydrogen, nitrogen, carbon monoxide, carbon dioxide and water. The reformate gas will typically include about 0.3-3 mole percent CO depending on the exit temperature of the WGS reactor 48, the space velocity of the reformate gas on the line 50, the steam to carbon ratio and the catalyst used. The reformate gas exits the WGS reactor 48 on the line 52 with less carbon monoxide and more hydrogen than the reformate gas on the line 50. However, the WGS reactor 48 cannot remove enough of the carbon monoxide in the reformate gas for the PEM fuel cell stack. Therefore, the reformate gas on the line 52 is sent to a PROX reactor 54. The operating temperature of the WGS reactor is greater than the operating temperature of the PROX reactor 54. Therefore, the temperature of the reformate gas exiting the WGS reactor 48 is above the operating temperature of the PROX reactor 54. Thus, a heat exchanger 56 is provided to cool the reformate gas on the line 52 to a reduced temperature on a line 58.

The PROX reactor 54 removes more of the carbon monoxide in the reformate gas that would otherwise contaminate the catalytic particles in the PEM fuel cell. The PROX reactor 54 selectively oxidizes carbon monoxide in the presence of hydrogen to produce carbon dioxide ($CO_2$) using oxygen from air as an oxidant. The reformate gas from the PROX reactor 54 is then provided to a fuel cell engine stack 60 on line 62, or is stored as compressed gas in a container for future use. Some primary reactor designs preheat a certain gas, such as nitrogen, that flows through the catalyst monolith to heat the catalyst therein at system start up. However, the known techniques for heating the catalyst monolith in the reactor at system start-up have heretofore been relatively inadequate.

State of the art primary reactors in a fuel processor system typically have a relatively long start-up time before the reactor becomes hot enough to dissociate the hydrocarbon fuel to produce hydrogen. The long start-up time is directly related to the relatively large mass and large volume of the catalyst monoliths in the reactor because of the energy needed to get the catalyst monoliths up to their operating temperature. It is desirable to reduce the start-up time of the fuel processor system by quickly heating the catalysts in the primary reactor when the system is turned on.

SUMMARY OF THE INVENTION

In accordance with the teachings of the present invention, a primary reactor for a fuel processor system is disclosed that employs steam and air to convert a liquid hydrocarbon fuel, such as gasoline, into a hydrogen-rich gas reformate stream. The liquid fuel and the air/steam mixture are mixed in a mixing region within the reactor to vaporize the liquid fuel. The fuel mixture is then directed through an electrically heated catalyst region that heats the mixture to the operating temperature of a light-off catalyst at system start-up. The electrically heated catalyst region can include the light-off catalyst. The heated fuel mixture is then directed through a light-off catalyst monolith where the hydrocarbon fuel is dissociated. Once the fuel mixture is heated to the operating temperature of the light-off catalyst, the electrically heated catalyst region is turned off because the exothermic reaction in the light-off catalyst monolith generates the heat necessary to sustain the catalytic reaction. The fuel mixture is then directed through a main catalyst monolith to provide steam reforming where the fuel is further dissociated to generate the hydrogen gas.

The electrically heated catalyst region can employ various configurations to quickly electrically heat the fuel mixture at system start-up. For example, the electrically heated catalyst region can be a front portion of the light-off catalyst monolith that is electrically heated. Alternately, the electrically heated catalyst region can be an electric heater positioned before the light-off catalyst monolith that may or may not be catalyzed. Further, the electrically heated catalyst region is also used to supply heat energy to vaporize the liquid fuel within the mixing region.

The electrically heated catalyst of the invention can be employed in a tail-gas combustor that burns the anode exhaust gas. In the tail-gas combustor, the electrically heated catalyst region is also employed to heat the catalyst that reacts with the hydrogen and oxygen to generate water.

Additional advantages and features of the present invention will become apparent from the following description and appended claims, taken in conjunction with the accompanying drawings.

DETAILED DESCRIPTION OF THE INVENTION

The following discussion of the embodiments of the invention directed to a primary reactor and a tail gas combustor for a fuel processing system is merely exemplary in nature, and is in no way intended to limit the invention or its applications or uses.

Figure 1:
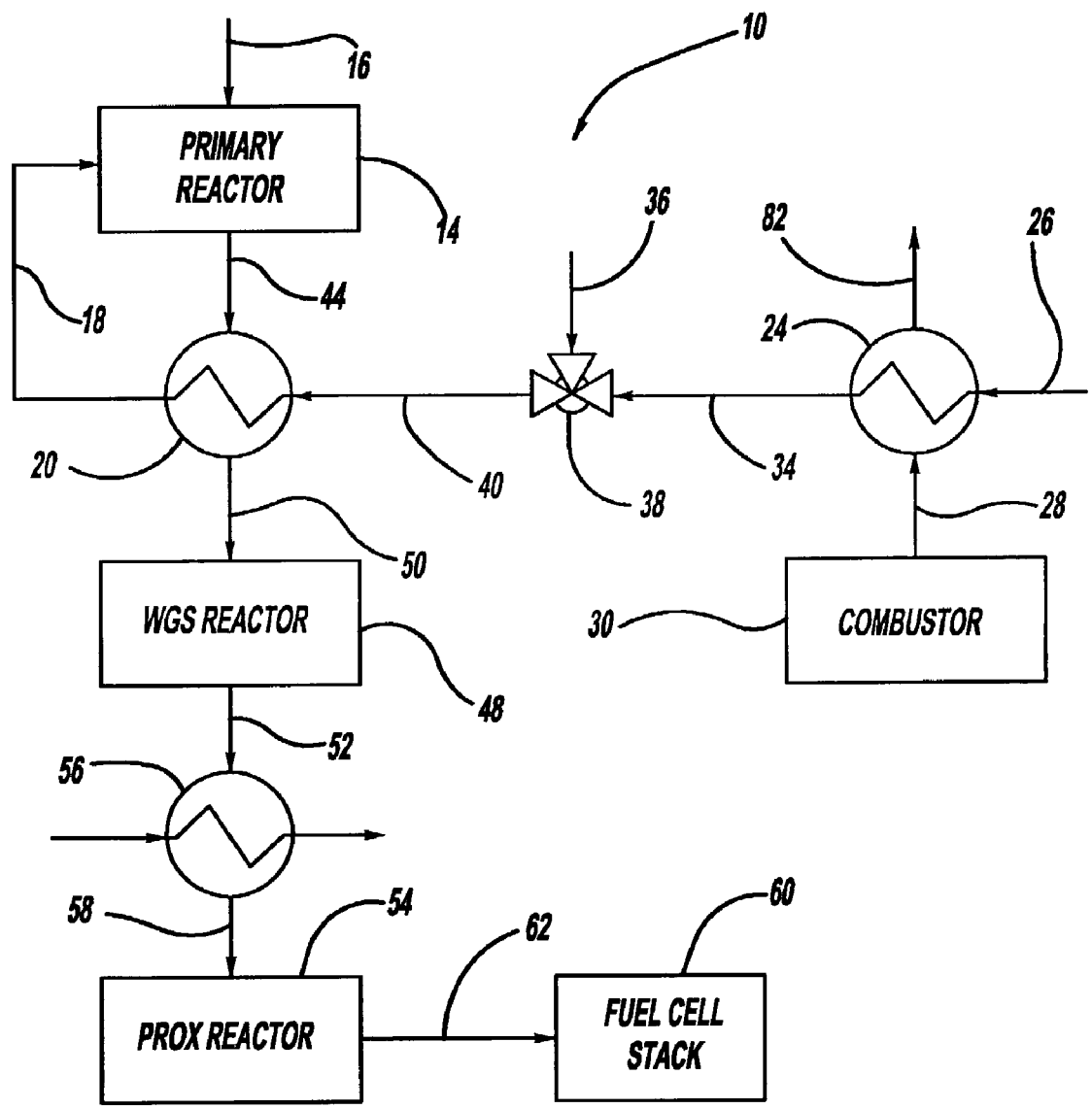
FIG. 1 is a schematic plan view of a fuel processing system.
Figure 2:
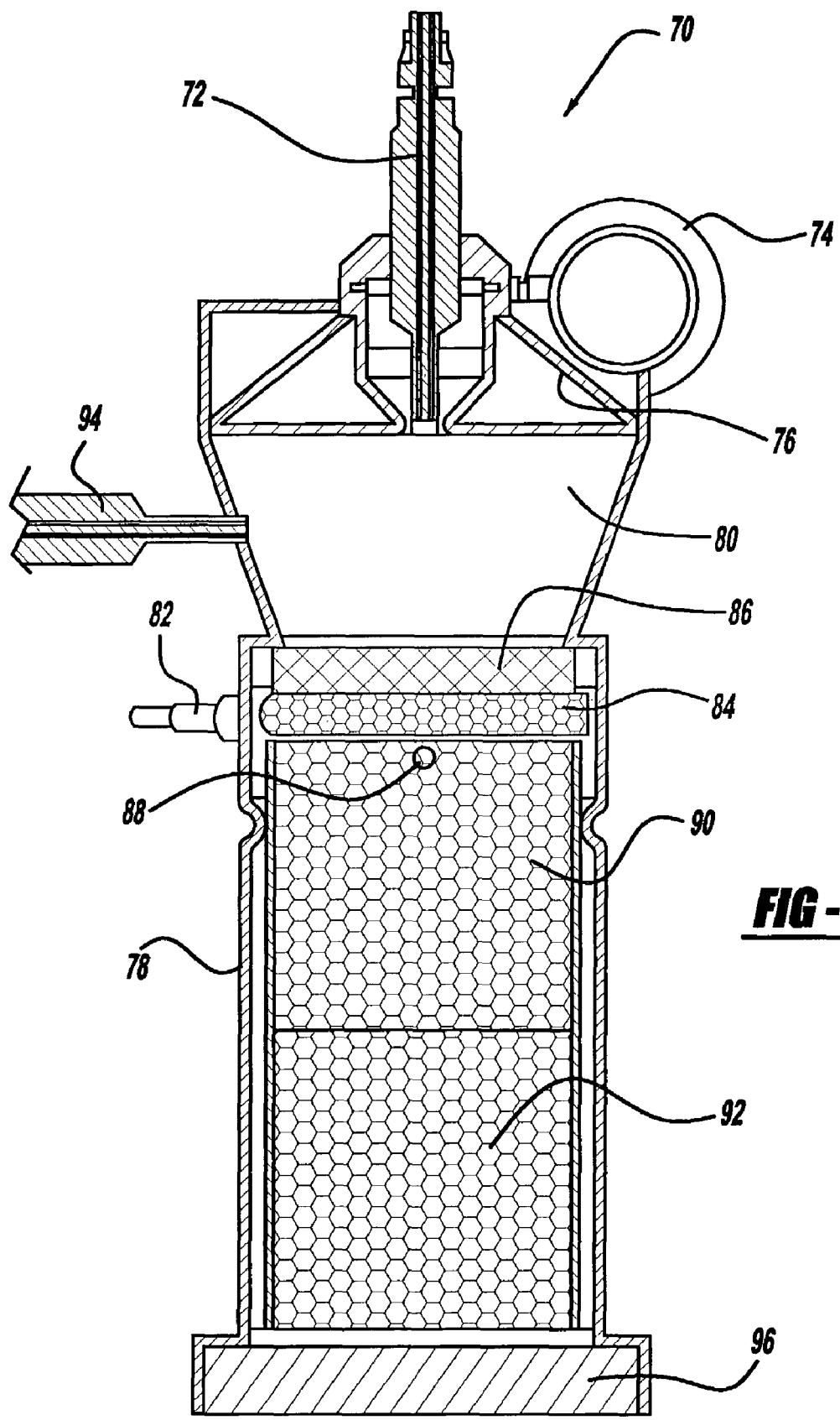
FIG. 2 is a cross-sectional view of an auto-thermal reactor for the fuel processing system shown in FIG. 1, according to an embodiment of the present invention.

FIG. 2 is a cross-sectional view of an auto-thermal reactor (ATR) 70 including an outer housing 78 that can be used as the reactor 14 in the fuel processing system 10. In an alternative embodiment, the ATR 70 can be a steam reformer. As will be discussed below, the ATR 70 employs catalysts that use steam and air to convert a liquid hydrocarbon fuel, such as gasoline, into a hydrogen-rich gas stream or reformate. The ATR 70 includes a liquid fuel injector 72 that receives the liquid hydrocarbon fuel on the line 16, and an inlet pipe 74 that receives the air/steam mixture on the line 18. The liquid hydrocarbon fuel from the injector 72 is sprayed into a mixing region 80. The air/steam mixture from the pipe 74 is received by a flow distribution device 76 that distributes it into the mixing region 80 where it mixes with the sprayed fuel. During steady-state operation, the temperature of the air/steam mixture is 500-700° C. so that the liquid fuel quickly vaporizes within the mixing region 80.

At system start-up, the distribution device 76 is cold, the air entering the pipe 74 is cold, and there is no heat to generate steam. The heat required to raise the temperature of the air/steam mixture entering the pipe 74 is provided by the heat exchanger 20. The heat for the heat exchanger 20 is provided by the reformate gas on the line 44 from the operation in the reactor 14. Therefore, some external heat source must be provided to raise the temperature of the catalysts within the reactor 14 to their operating temperature to generate the steam.

It is desirable to raise the temperature of the catalysts within the ATR 70 to their operating temperature very quickly at system start-up so that hydrogen is produced as soon as possible. According to the invention, an electrically heated catalyst (EHC) region 84 is provided so that the catalytic reaction within the ATR 70 is initiated quickly at a variety of ambient conditions with minimal mass, volume, pressure drop and parasitic energy. The EHC region 84 includes a catalyzed substrate or monolith through which the fuel mixture from the mixing region 80 flows. The catalyst is deposited on the monolith within the EHC region 84 by any conventional technique. The catalyzed monolith in the EHC region 84 provides a nearly immediate catalytic reaction at system start-up so that exothermic heat is generated very quickly. The catalyzed monolith can employ any catalyst, such as a light-off platinum catalyst, suitable for the purposes discussed herein. The slippage of unreacted hydrocarbons during start-up can be reduced by selecting an EHC with minimal thermal mass and a light-off catalyst having a minimal temperature.

The EHC region 84 receives an external electrical signal from an electrical input 82. Once the catalyst reaction is sustained, the EHC region 84 will typically be turned off. A thermocouple 88, or other suitable device, can be provided to measure the temperature of the various monoliths within the housing 78 proximate the EHC region 84 so that the system 10 knows when to turn off the EHC region 84 once it reaches the operating temperature of the catalyst. The size of the EHC region 84 is application specific in that different fuels and different catalysts may require different sized EHC regions.

In one embodiment, the EHC region 84 includes an electric heater. The heater may or may not be catalyzed. However, it is stressed that the EHC region 84 can include any suitable device that electrically heats the fuel mixture at system start-up.

During ATR start-up, the EHC region 84 is also used to supply heat energy to vaporize the liquid fuel within the mixing region 80. The back radiation and conduction from the reaction in the EHC region 84 and the downstream catalysts will support liquid vaporization within the mixing region 80 until the steam/air mixture entering the inlet pipe 74 reaches a sufficient temperature to directly vaporize the liquid fuel spray from the injector 72.

The heat from the catalytic reaction in the EHC region 84 could lead to auto-ignition of the fuel mixture within the mixing region 80, which could damage the fuel injector 72 and the flow distribution device 76 and form soot therein. To minimize the auto-ignition risk, a thin un-catalyzed substrate 86 is positioned before the EHC region 84, as shown. The substrate 86 acts as a radiant shield that blocks much of the heat from entering the flow distribution device 76. The substrate 86 absorbs radiant and conductive heat, and also acts to vaporize the fuel from the injector 72 that passes through the mixing region 80 once the ATR 70 is at its operating temperature. The substrate 86 can be made of various materials, such as a ceramic, for example cordierite, or a high temperature metal alloy, such as stainless steel. Alternately, the substrate 86 can be a heat resistant foam or a honeycomb structure.

The reformate gas flow passes through the substrate 86 and the EHC region 84, and enters a light-off catalyst region 90. In one embodiment, the EHC region 84 is part of a forward portion of the catalyst monolith within the light-off catalyst region 90, where only that part of the light-off catalyst monolith is electrically heated. The light-off catalyst region 90 includes a suitable catalyst, such as a platinum-rhodium catalyst, mounted on a suitable substrate or monolith depending on the application requirements. Foams or other structures can also be used that induce gas-to-catalyst surface interaction and provide reaction stability.

The gas reformate flow passes through the catalyst region 90 and into a main catalyst region 92. In one embodiment, the main catalyst region 92 includes a 600 cells per square inch (CPSI) parallel channel monolith made of cordierite having a similar catalyst as the light-off catalyst. The main catalyst could be made of other materials and geometric configurations, as would be well understood to those skilled in the art. In one design, the main catalyst region 92 includes a catalyst that is a steam reforming catalyst, i.e., is not a partial oxidation catalyst that provides an exothermic reaction. The reformate gas then flows through a radiant shield 96 and into the remaining portions of the fuel processing system 10, as discussed above.

The hydrocarbon fuel can be reacted catalytically in the ATR 70 with only air, i.e., without steam, but the catalyst must typically be at least 300° C. and preferably above 400° C. Without steam, the ATR catalyst undergoes partial oxidization of the liquid fuel. Therefore, sufficient air must be provided, i.e., O/C>1. Otherwise sooting and/or unburned hydrocarbons will be produced which will potentially damage both the ATR catalyst and other catalysts downstream, such as the catalysts in the WGS reactor 48. However, the reaction is extremely exothermic. If operated too close to stoichiometry, i.e., O/C≈3, the temperature of the ATR catalyst will exceed material limits. Typically, a metal electrically-heated catalyst operation is limited to about 950° C., where less than 900° C. is desired. This limits the rich O/C operation window of the ATR 70 during this initial no-steam start period to between 1.0 and 1.1. Starting the ATR 70 with sufficient excess air (lean) is another alternative, provided there are no downstream catalysts that are degraded with exposure to oxygen, such as a copper-zinc catalyst-based WGS reactor.

For those times when the operating temperature is at O/C>1 and below temperature limits, water could be injected into the mixing region 80 by a spray injector 94, so the water is atomized along with the fuel. The fuel and water would be metered by the injectors 72 and 94, respectively.

Table I below provides the reaction temperatures and methane levels at two atmospheres of pressure with and without water at a steam to carbon ratio (S/C) of 1. As can be seen, even with these very stringent mixing requirements, the reaction temperatures will create durability challenges, i.e., greater than 900° C. The addition of water into the mixing region 80 helps to reduce the reactor temperature at which acceptably low methane levels (<100 ppm) can be obtained. For example, without steam, 8000 ppm methane is formed at 830° C., whereas with a water level of S/C=1 and a reactor temperature of 800° C., the methane level is only 140 ppm. It is noted that when the catalyst regions 90 and 92 are not fully heated, they are still active and could produce methane. Water would help reduce methane formation.

TABLE I

|  | O/C | T(C) | CH₄ (molar) |
|---|---|---|---|
| (S/C = 0, dry) | 1.0 | 830 | 8000 ppm |
|  | 1.1 | 930 | 300 ppm |
|  | 1.2 | 1060 | 9 ppm |
| (S/C = 1, with water) | 1.10 | 650 | 13000 ppm |
|  | 1.21 | 703 | 2000 ppm |
|  | 1.32 | 800 | 140 ppm |

Figure 3:
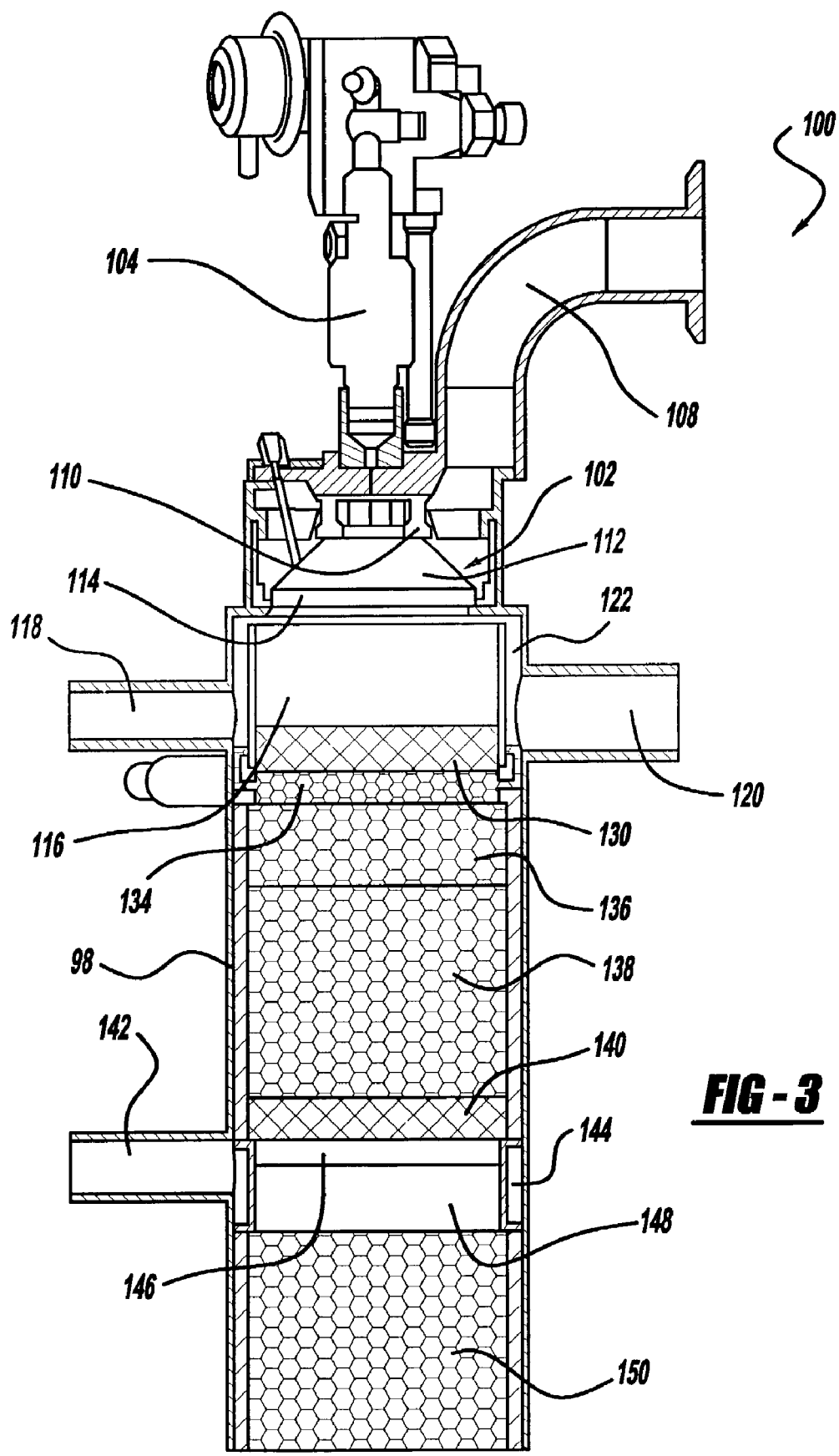
FIG. 3 is a cross-sectional view of a tail gas combustor for use in a fuel cell engine, according to an embodiment of the present invention.

FIG. 3 is a cross-sectional view of a tail gas combustor 100 including an outer housing 98. In one embodiment, the tail-gas combustor 100 is the combustor 30 that provides the heat to form steam. The combustor 100 is capable of operating on liquid fuel, liquid fuel and a node exhaust gas or anode exhaust gas alone. The combustor 100 can use liquid fuel to generate heat during system start-up to preheat components within the fuel processor system. During steady-state operation, the combustor 100 combusts anode exhaust gas using the cathode exhaust gas as an oxidant. In some applications, the combustor 100 could combust liquid fuel and the anode exhaust gas during normal operation if needed.

The combustor 100 needs to supply the heat input required at the desired temperature to the desired reaction, minimize compressor demands, minimize pressure drop, meet emissions targets, and meet start-up and transient performance requirements. According to the invention, the combustor 100 combusts liquid fuel catalytically during start-up while maintaining a controlled combustion process using liquid fuel and/or the anode exhaust gas during normal operation to maintain control of the catalyst bed temperature, as well as to minimize the potential for flame in the inlet mixing zone. By using a directly coupled injector to a combustion housing, it will be critical to avoid a flame within a mixing region 102 that would result in a potentially severe environment for the metering device that could potentially cause component failure.

During those times when the combustor 100 burns liquid fuel, the fuel is sprayed into the mixing region 102 of the combustor 100 through a liquid fuel injector 104. Air enters the mixing region 102 through an inlet pipe 108. The mixing region 102 includes a tangential air injection region 110, an air and fuel mixing region 112 and a radial air injection region 114, such as a gap. Alternatively, the region 114 could include orifices around its circumference. The fuel enters the injection region 110 in an onion-shaped flow pattern where it is pulled apart by the air from the inlet pipe 108. The air is injected tangentially into the region 110 in order to induce high sheer to break up the fuel into a fine mist of particles that enter the region 112. The air from a pipe 120 is also radially injected into the region 114.

Anode exhaust gas is introduced into a chamber 116 in the combustor 100 through a pipe 118 and cathode exhaust gas is introduced into the chamber 116 through a pipe 120. In an alternate design, depending on system specifications and architectures, the pipe 108 and the cathode exhaust gas pipe 120 could be combined. An annular gap 122 is provided to mix the anode and cathode exhaust gas before they are injected into the chamber 116.

The fuel mixture and/or the cathode/anode exhaust gas mixture passes through a radiant shield 130 similar to the radiant shield 86. In one embodiment, the radiant shield 130 or 86 is a 40 ppli (pore per linear inch) reticulated foam structure made of yttria-zirconia-alumina (YZA), although it could also be made of many alternate materials, such as silicon carbide, zirconia toughened alumina or structures, such as a woven metal matrix, parallel channel monolith, screens, etc., depending on the mixing and distribution requirements.

The fuel mixture then flows through an EHC region 134 similar to the region 84 above. In one embodiment, the EHC region 134 or 84 includes a metal honeycomb structure having a density of about 350 CPSI. The EHC region 134 employs a suitable catalyst, such as palladium, although other precious metals can be used. During start-up, the EHC region 134 is used to supply energy to vaporize the liquid within the fuel mixture, and initiate the exothermic reaction. Once the reaction is sustained, the EHC region 134 will under most conditions be turned off, and the back radiation and conduction from the reaction in the EHC region 134 and the downstream catalysts will support liquid vaporization within the chamber 116 and/or the mixing region 102. Under some conditions, the EHC region 134 could use the distribution foam temperature feed back to control the EHC power cycle. Depending on the application requirements, the EHC region 134 could be just an electrical heater.

The fuel mixture exits the EHC region 134 and passes into a light-off catalyst region 136 similar to the region 90 above. In one embodiment, the catalyst region 136 or 90 is a 400 ppi reticulated foam. The catalyst region 136 could use a platinum/palladium catalyst, although other precious metals or combinations of precious metals can be used depending on the particular application and the economic trade off. Alternatively, geometric foams or structures are also possible, as described above, in order to induce turbulence and improve reaction stability.

The fuel mixture then passes to a main catalyst region 138 similar to the region 92 above. In one embodiment, the main catalyst region 138 or 92 includes a 600 cspi parallel channel monolith made of cordierite and having a similar catalyst as the catalyst for the region 136. The main catalyst region 138 could include alternative materials or geometric configurations as discussed herein. The fuel mixture then continues through another radiant shield 140.

A mid-stage air inlet pipe 142 receives air from a suitable location (not shown) and distributes it to the full circumference of an annular gap 144 to mix the air with the fuel mixture passing through the radiant shield 140 in a mixing chamber 146. The second stage air allows more of the hydrogen that may otherwise not have been combusted to be combined with air for further catalytic combustion. The fuel mixture then passes from the mixing chamber 146 to a radiant shield and flow distribution zone 148. From there, the fuel mixture passes through another catalyst region 150 to provide further combustion.

The described design strategy of the invention combusts the fuel in stages to maintain control of the reaction temperature for heat integration, as well as avoid ignition on the hot catalyst surface and the resulting flame propagation into the inlet region resulting in component failure or local hot regions in the catalyst resulting in catalyst bed degradation or emissions. The staging operation avoids the potential for flammable mixtures that allow for a reduction in pressure drop and the potential for interstage heat exchangers to operate closer to stoichiometry resulting in a potentially lower air requirement.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A reactor for a fuel processing system, said reactor comprising:
   a fuel inlet for introducing a fuel into the reactor;
   an air/steam inlet for introducing an air/steam mixture into the reactor;
   a mixing region for mixing the air/steam mixture and the fuel into a fuel mixture;
   an electrically heated catalyst receiving the fuel mixture, said electrically heated catalyst being electrically heated at start-up of the fuel processing system;
   a light-off catalyst, said light-off catalyst receiving the fuel mixture from the electrically heated catalyst, wherein the electrically heated catalyst is a forward portion of the light-off catalyst; and
   a main catalyst receiving the fuel mixture from the light-off catalyst, said main catalyst converting the fuel mixture to a hydrogen-rich gas stream, said electrically heated catalyst, light-off catalyst and main catalyst being positioned in a common housing.

2. The reactor according to claim 1 wherein the electrically heated catalyst is part of an electric heater.

3. The reactor according to claim 1 wherein the fuel inlet is a spray injector that sprays a liquid fuel into the mixing region as a fine mist.

4. The reactor according to claim 3 wherein the spray injector sprays the liquid fuel onto the electrically heated catalyst.

5. The reactor according to claim 1 further comprising a thermocouple positioned within or proximate to the electrically heated catalyst, said thermocouple providing a temperature output reading for turning off the electrically heated catalyst after the fuel mixture reaches a predetermined temperature.

6. The reactor according to claim 1 further comprising a water inlet for introducing water into the mixing region.

7. The reactor according to claim 6 wherein the water inlet is a water spray injector.

8. The reactor according to claim 1 further comprising a radiant shield positioned between the mixing region and the electrically heated catalyst, said radiant shield blocking heat from the electrically heated catalyst.

9. The reactor according to claim 1 further comprising a distribution device, said distribution device receiving the air/steam mixture and distributing the air/steam mixture into the mixing region.

10. The reactor according to claim 1 wherein the reactor is selected from the group consisting of auto-thermal reactors and steam reforming reactors.

11. An auto-thermal reactor for a fuel processing system, said reactor comprising:
    a mixing region;
    a liquid fuel spray injector for spraying a liquid hydrocarbon fuel into the mixing region;
    an air/steam inlet for introducing an air/steam mixture into the mixing region, said mixing region mixing the air/steam mixture into a fuel mixture;
    a radiant shield positioned adjacent to the mixing region for protecting the mixing region from heat;
    an electrically heated catalyst positioned adjacent to the radiant shield for receiving the fuel mixture, said electrically heated catalyst being electrically heated at start-up of the fuel processing system so as to generate an exothermic reaction;
    a light-off catalyst receiving the fuel mixture from the electrically heated catalyst, said light-off catalyst also providing an exothermic catalytic reaction, wherein the electrically heated catalyst is a forward portion of the light-off catalyst; and
    a main catalyst receiving the fuel mixture from the light-off catalyst, said main catalyst providing a catalytic reaction for converting the fuel mixture to a hydrogen-rich gas stream, said electrically heated catalyst, light-off catalyst and main catalyst being positioned in a common housing.

12. The reactor according to claim 11 wherein the spray injector sprays the liquid fuel onto the electrically heated catalyst.

13. The reactor according to claim 11 further comprising a thermocouple positioned within or proximate to the electrically heated catalyst, said thermocouple providing a temperature output reading for turning off the electrically heated catalyst after the fuel mixture reaches a predetermined temperature.

14. The reactor according to claim 11 further comprising a water spray injector for spraying water into the mixing region.

15. The reactor according to claim 11 further comprising a distribution device, said distribution device receiving the air/steam mixture and distributing the air/steam mixture into the mixing region.

16. A reactor for a fuel processing system, said reactor comprising:
    a fuel inlet for introducing a fuel into the reactor;
    an air/stream inlet for introducing an air/stream mixture into the reactor;
    a mixing region for mixing the air/stream mixture and the fuel into a fuel mixture;
    an electric heater receiving the fuel mixture, said electric heater including a catalyst, said electric heater being electrically heated at start-up of the fuel processing system;
    a light-off catalyst receiving the fuel mixture from the electric heater;
    a main catalyst receiving the fuel mixture from the light-off catalyst, said main catalyst converting the fuel mixture to a hydrogen-rich gas stream, said electric heater, light-off catalyst and main catalyst being positioned in a common housing; and
    a water inlet for introducing water into the mixing region.

17. The reactor according to claim 16 wherein the fuel inlet is a spray injector that sprays a liquid fuel into the mixing region as a fine mist.

18. The reactor according to claim 16 wherein the spray injector sprays the liquid fuel onto the electric heater.

19. The reactor according to claim 16 further comprising a thermocouple positioned within or proximate to the electric heater, said thermocouple providing a temperature output reading for turning off the electric heater after the fuel mixture reaches a predetermined temperature.

20. The reactor according to claim 16 wherein the water inlet is a water spray injector.

21. The reactor according to claim 16 further comprising a radiant shield positioned between the mixing region and the electric heater, said radiant shield blocking heat from the electric heater.

22. The reactor according to claim 16 further comprising a distribution device, said distribution device receiving the air/steam mixture and distributing the air/steam mixture into the mixing region.

23. The reactor according to claim 16 wherein the reactor is selected from the group consisting of auto-thermal reactors and steam reforming reactors.

24. A reactor for a fuel processing system, said reactor comprising:
- a fuel inlet for introducing a fuel into the reactor;
- an air/steam inlet for introducing an air/steam mixture into the reactor;
- a mixing region for mixing the air/steam mixture and the fuel into a fuel mixture;
- an electrically heated catalyst receiving the fuel mixture, said electrically heated catalyst being electrically heated at start-up of the fuel processing system;
- a light-off catalyst, said light-off catalyst receiving the fuel mixture from the electrically heated catalyst;
- a main catalyst receiving the fuel mixture from the light-off catalyst, said main catalyst converting the fuel mixture to a hydrogen-rich gas stream, said electrically heated catalyst, light-off catalyst and main catalyst being positioned in a common housing; and
- a water inlet for introducing water into the mixing region.

25. The reactor according to claim 24 wherein the water inlet is a water spray injector.

26. A reactor for a fuel processing system, said reactor comprising:
- a fuel inlet for introducing a fuel into the reactor;
- an air/steam inlet for introducing an air/steam mixture into the reactor;
- a mixing region for mixing the air/steam mixture and the fuel into a fuel mixture;
- an electrically heated catalyst receiving the fuel mixture, said electrically heated catalyst being electrically heated at start-up of the fuel processing system;
- a light-off catalyst, said light-off catalyst receiving the fuel mixture from the electrically heated catalyst;
- a main catalyst receiving the fuel mixture from the electrically heated light-off catalyst, said main catalyst converting the fuel mixture to a hydrogen-rich gas stream, said electrically heated catalyst, light-off catalyst and main catalyst being positioned in a common housing; and
- a distribution device, said distribution device receiving the air/stream mixture and distributing the air/stream mixture into the mixing region.

27. An auto-thermal reactor for a fuel processing system, said reactor comprising:
- a mixing region;
- a liquid fuel spray injector for spraying a liquid hydrocarbon fuel into the mixing region;
- an air/steam inlet for introducing an air/steam mixture into the mixing region, said mixing region mixing the air/steam mixture into a fuel mixture;
- a radiant shield positioned adjacent to the mixing region for protecting the mixing region from heat;
- an electrically heated catalyst positioned adjacent to the radiant shield for receiving the fuel mixture, said electrically heated catalyst being electrically heated at start-up of the fuel processing system so as to generate an exothermic reaction;
- a light-off catalyst receiving the fuel mixture from the electrically heated catalyst, said light-off catalyst also providing an exothermic catalytic reaction;
- a main catalyst receiving the fuel mixture from the light-off catalyst, said main catalyst providing a catalytic reaction for converting the fuel mixture to a hydrogen-rich gas stream, said electrically heated catalyst, light-off catalyst and main catalyst being positioned in a common housing; and
- a water spray injector for spraying water into the mixing region.

28. An auto-thermal reactor for a fuel processing system, said reactor comprising:
- a mixing region;
- a liquid fuel spray injector for spraying a liquid hydrocarbon fuel into the mixing region;
- an air/steam inlet for introducing an air/steam mixture into the mixing region, said mixing region mixing the air/steam mixture into a fuel mixture;
- a radiant shield positioned adjacent to the mixing region for protecting the mixing region from heat;
- an electrically heated catalyst positioned adjacent to the radiant shield for receiving the fuel mixture, said electrically heated catalyst being electrically heated at start-up of the fuel processing system so as to generate an exothermic reaction;
- a light-off catalyst receiving the fuel mixture from the electrically heated catalyst, said light-off catalyst also providing an exothermic catalytic reaction;
- a main catalyst receiving the fuel mixture from the light-off catalyst, said main catalyst providing a catalytic reaction for converting the fuel mixture to a hydrogen-rich gas stream, said electrically heated catalyst, light-off catalyst and main catalyst being positioned in a common housing; and
- a distribution device, said distribution device receiving the air/steam mixture and distributing the air/steam mixture into the mixing region.

* * * * *